United States Patent
Bertini

(10) Patent No.: US 6,494,516 B1
(45) Date of Patent: Dec. 17, 2002

(54) GRIPPER DEVICE

(76) Inventor: Millo Bertini, 679 Garden St., Trumbull, CT (US) 06611

( * ) Notice: Subject to any disclaimer, the term of this patent is extended or adjusted under 35 U.S.C. 154(b) by 0 days.

(21) Appl. No.: 09/933,789

(22) Filed: Aug. 21, 2001

(51) Int. Cl.$^7$ ............................................. B25J 15/10
(52) U.S. Cl. ...................... 294/88; 294/119.1; 294/93; 901/37
(58) Field of Search ..................... 294/2, 88, 119.1, 294/93, 94; 901/31, 37, 39; 29/888.04, 888.07, 888.3, 222

(56) References Cited

U.S. PATENT DOCUMENTS

| | | | |
|---|---|---|---|
| 4,257,639 A | * | 3/1981 | Stock ........................ 244/137.4 |
| 4,611,846 A | | 9/1986 | Feiber et al. |
| 4,729,588 A | * | 3/1988 | Kratzer ........................ 294/115 |
| 4,913,481 A | | 4/1990 | Chin et al. |
| 5,125,708 A | | 6/1992 | Borcea et al. |
| 5,163,720 A | | 11/1992 | Borcea et al. |
| 5,620,223 A | | 4/1997 | Mills |
| 5,871,250 A | * | 2/1999 | Sawdon ........................ 294/119.1 |
| 5,967,581 A | | 10/1999 | Bertini |
| 6,318,779 B1 | * | 11/2001 | Hanne et al. ............ 294/119.1 |

* cited by examiner

*Primary Examiner*—Dean J. Kramer
(74) *Attorney, Agent, or Firm*—Fattibene & Fattibene; Paul A. Fattibene; Arthur T. Fattibene

(57) ABSTRACT

A gripper device particularly suitable for positioning an annular member onto a workpiece that includes a housing having a pair of piston chambers, each of the piston chambers having a piston reciprocally mounted therein. A cover plate, having a plurality of radial slides mounted therein for radial movement, is connected to the housing. A plurality of through holes are also formed in the cover plate. One of the pistons has a piston rod to which each of the radial slides is connected thereto by an interconnecting link. The other piston is provided with a pusher disposed in alignment with each of the through holes to extend therethrough in the operative position. The piston actuating the slides is fluid actuated between operative and inoperative positions and the pusher piston is fluid actuated toward operative position and spring biased toward inoperative position. A gripping finger is adjustably positioned on each of the slides for handling annular members of different sizes.

24 Claims, 5 Drawing Sheets

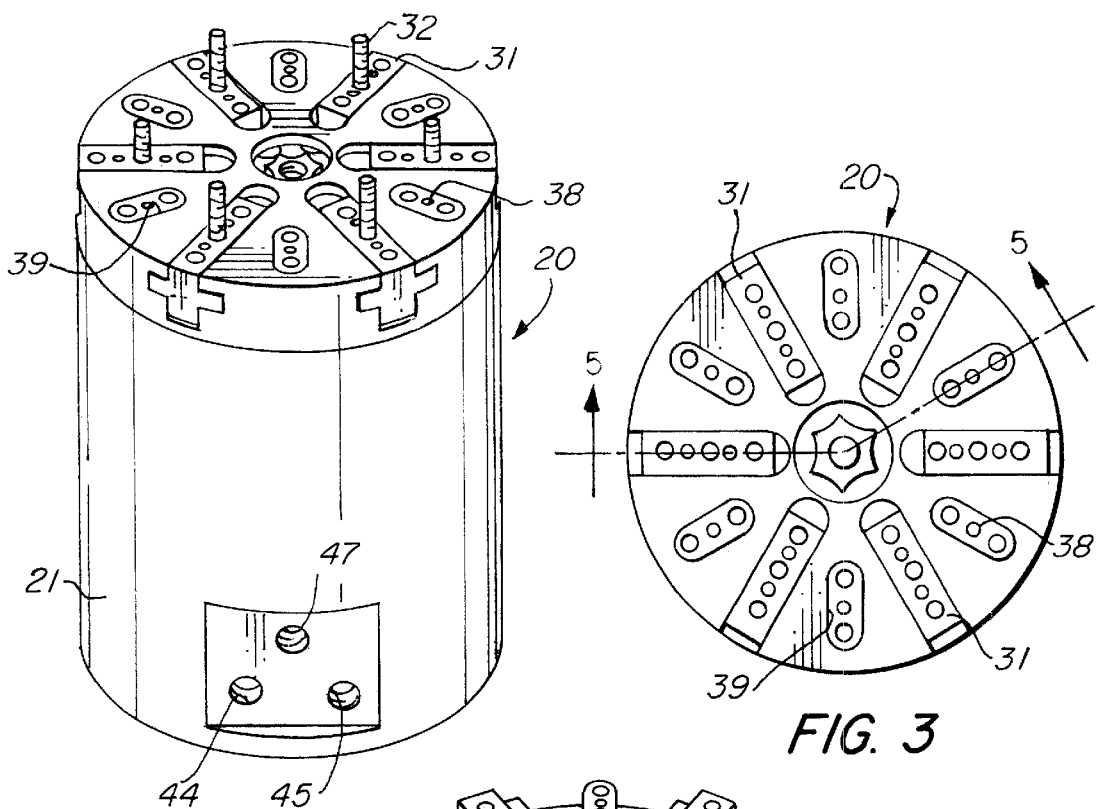
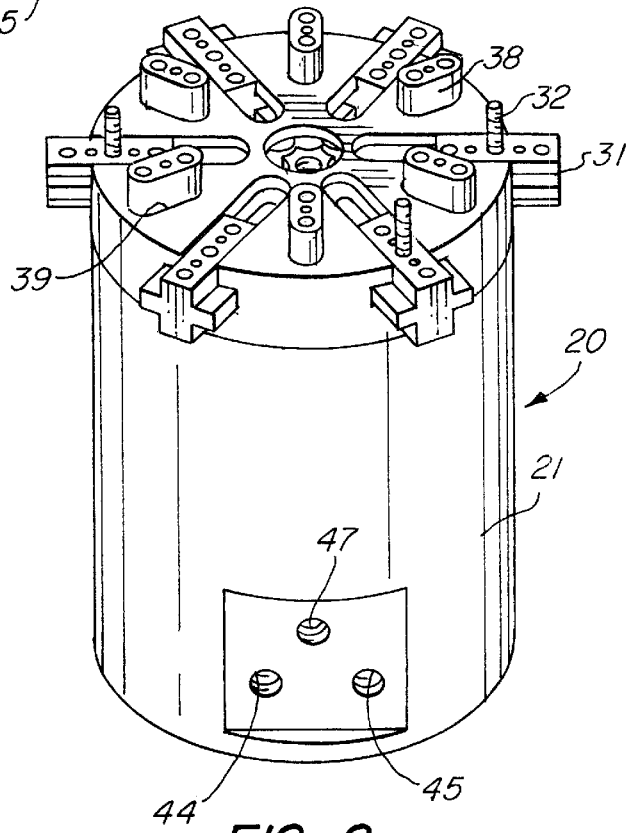
FIG. 1
FIG. 3
FIG. 2

GRIPPER DEVICE

FIELD OF THE INVENTION

A gripper device, and more specifically to a gripper device which is particularly suitable for placing an annular member onto a workpiece.

BACKGROUND OF THE INVENTION

Various types of mechanical grippers for use on automatic machines and/or robotic tools for holding, positioning and/ or locating a particular workpiece or part are known. Some of the known grippers are disclosed in various U.S. Letters Patents, e.g. U.S. Pat. Nos. 4,611,846; 4,913,481; 5,125,708; 5,163,729; 5,620,223 and 5,967,581. While the grippers disclosed in these patents may be satisfactory for positioning or gripping a workpiece of a given configuration or shape, they are not suitable for gripping an annular member such as a washer, O-ring and the like, or to position the same onto a workpiece.

SUMMARY OF THE INVENTION

An object of this invention is to provide a gripper for use with a machine or robotic tool that is particularly suitable for gripping an annular shape member, e.g. an "O" ring and/or for placing the same onto a workpiece.

Another object is to provide a gripper for positioning an annular member that is relatively simple, inexpensive to manufacture, and positive in operation.

Another object is to provide a gripper particularly suitable for gripping and/or positioning an expandable annular member which can be readily adjusted to handle expandable annular members of various sizes within a given range of sizes.

The foregoing objects and other features and advantages are attained by a gripper assembly which includes a housing having formed therein a pair of piston chambers, each having a piston reciprocally mounted therein. A cover plate provides a closure for the housing. The cover plate is formed with a plurality of radial slideways, each having a slide reciprocally disposed within a corresponding slideway. Each of the slides has a plurality of apertures or holes for adjustably positioning a gripper finger thereon.

The piston in one of the piston chambers is provided with a piston rod which extends beyond the associated piston chamber. A plurality of links interconnects each of the respective slides to the projected end of the piston rod whereby actuation of the piston imparts a relative radial sliding movement to each of the slides. Also formed in the cover plate are a plurality of through holes.

The piston in the other piston chamber includes a piston head having a plurality of circumferentially spaced longitudinally extending arms having connected thereto a pusher disposed in alignment with the through holes formed in the cover plate. Between the adjacent pairs of piston arms there is a spring for exerting a spring bias on the piston head. A compression ring is supported within the housing to maintain the springs in compression. The arrangement is such that fluid pressure applied to the first mentioned piston will effect the displacement thereof causing the links to radially displace the connected slides outwardly whereby the fingers mounted on the respective slides will grip and hold an annular member thereon. Subsequent actuation of the other piston will cause the pushers to project through the through holes of the cover plate to push the annular member off the slide fingers and onto a workpiece positioned to receive the annular member. Upon the push off of the annular member from the slide fingers, the springs acting on the pusher piston will bias the pusher piston and associated pushers toward the inoperative position or retracted position.

IN THE DRAWINGS

FIG. 1 is a perspective view of a gripper embodying the invention, illustrating the slides in an inoperative or normal position.

FIG. 2 is a view similar to FIG. 1 showing the slides in a radially protracted position and the pushers projecting upwardly through the cover through holes.

FIG. 3 is a top view of FIG. 1 without the slide fingers.

DETAILED DESCRIPTION

Figure 4:
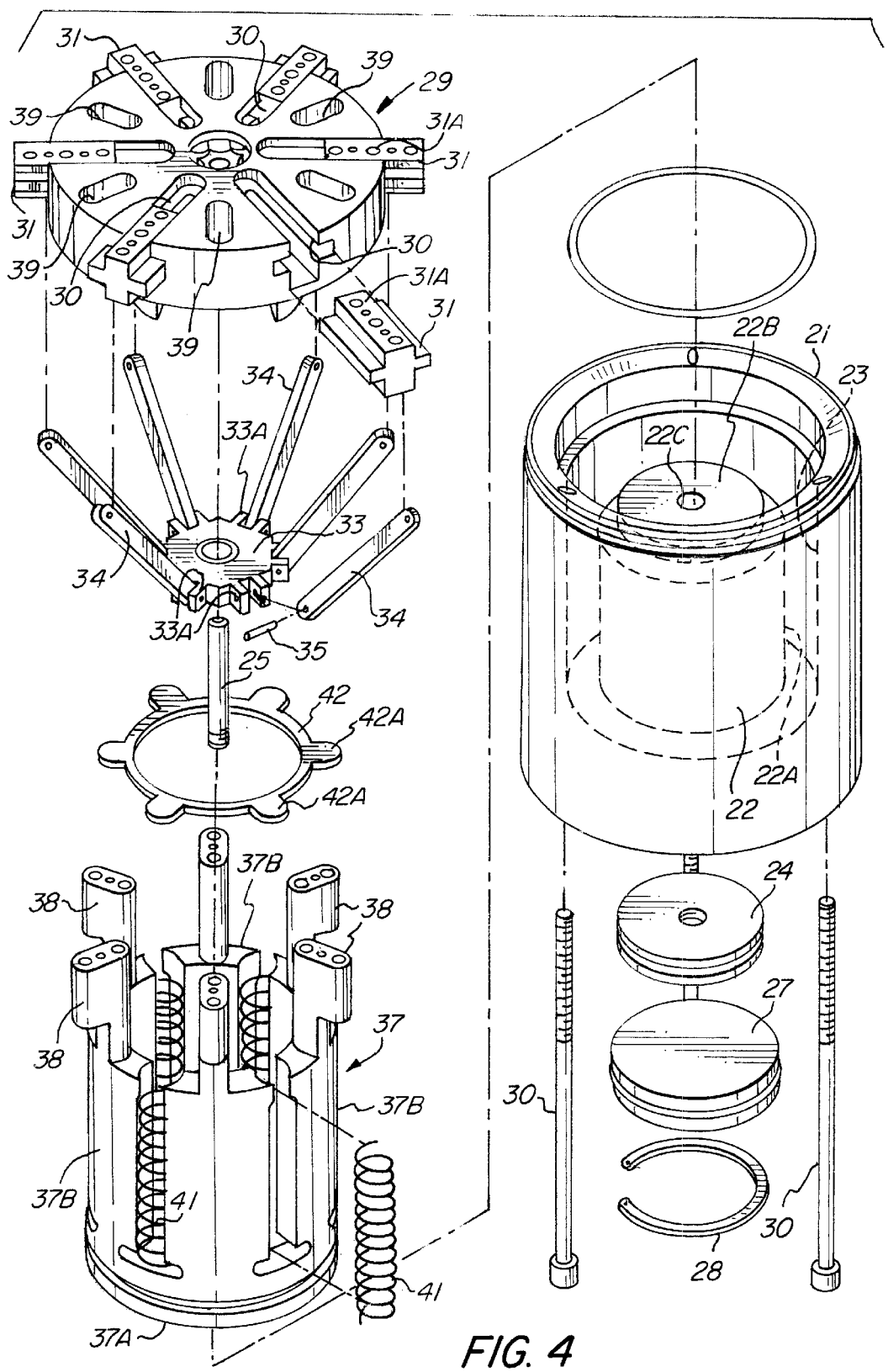
FIG. 4 is an exploded perspective view of the component parts.

Referring to the drawings, there is shown a gripper assembly 20 embodying the invention. As best seen in FIGS. 1 to 4, the gripper assembly 20 includes a housing 21 which defines a pair of piston chambers 22 and 23. Piston chamber 22 is defined by a circumscribing wall 22A formed within housing 21 which is capped by an end wall 22B having an opening 22C therein. Piston chamber 23 circumscribes piston chamber 22.

Reciprocally disposed within piston chamber 22 is a piston 24 having a connected piston rod 25 having its free end extending through the opening or hole 22C formed in the end wall 22B. A seal or O-ring 26 circumscribes the piston 25 to effect a sealing arrangement. An end plug 27 seals the lower end of the piston chamber 22. A retainer ring 28 secures the end plug 27 in the housing 21 at the bottom thereof as viewed in FIGS. 5 to 7.

A cover plate 29 forms the closure for housing 21 at the upper end thereof. Suitable long bolts 30 extending up through the housing 21 secures the cover plate 29 to the housing 21. As best seen in FIG. 4, the cover plate has formed therein a series of radially spaced grooves having a cruciform cross-section to define a plurality of radial slideways 30. A complementary cruciform slide 31 is reciprocally mounted in each of the slideways 30. As shown, each of the slides 31 has formed thereon a plurality of adjustment holes 31A for adjustably receiving a gripping finger 32. It will be understood that the respective gripping finger 32 may be adjustably positioned on their respective slides 31 to accommodate annular members of various sizes or diameters, as will be hereinafter described.

In accordance with this invention, the respective slides 31 are connected to the piston rod 25 by means of interconnecting links. As best seen in FIG. 4, link ring 33 is fixedly connected to the free end of the piston rod 25. The link ring 33 is provided with circumferentially spaced pairs of lugs 33A for pivotally securing therebetween one end of an interconnecting link 34 by a suitable pin 35. The other end of link 34 is connected to the underside of a corresponding slide 31 by a similar link pin 36. It will be noted that displacement of piston 24 within its piston chamber 22 will cause the respective slides 31 to be radially displaced within their respective slideways 30 between a retracted and protracted position.

Another or second piston 37 is reciprocally disposed in piston chamber 23. As best seen in FIG. 4, piston 37 includes a piston head 37A having circumferential space thereon about the outer periphery thereof a plurality of spaced apart longitudinally extending columns or arms 37B. Connected to the upper end of the respective columns or arms 37B is a pusher 38.

As best seen in FIGS. 1 to 4, the cover plate 29 is provided with a plurality of circumferentially spaced through holes 39. In the illustrated embodiment, the respective through holes 39 are elongated with curvilinear end walls. The respective through holes 39 are positioned intermediately between adjacent pairs of slideways 30. The pushers 38 have a shape complementary to the shape of their corresponding through holes 39. The piston 37, when seated in piston chamber 23, is oriented so that the respective pushers 38 are disposed in alignment with a corresponding through hole 39. A suitable sealing ring 40 circumscribes the piston head 37A of piston 37.

A spring means illustrated in the form of a coil spring 41 is retained in the space defined between adjacent pairs of piston arms 37B which functions to maintain a spring bias on piston 37. Mounted on the circumscribing wall of the piston chamber 22 adjacent the chamber end wall 22B is a spring retainer ring 42. As best seen in FIG. 4, the spring retainer ring 42 is provided with a plurality of radial outwardly protruding elements 42A arranged to be received within the space formed between adjacent pairs of piston arms 37B. The arrangement is such that each of the respective piston springs 41 are maintained in compression between the piston head 37A and the retaining element 42A of the spring retainer ring 42 in position on piston chamber 22. The cover plate 29 is provided with several spaced apart depending bearing members 43 which, in the assembled position of the cover plate 29, will exert a bearing force on the spring retainer ring 42 as evident in FIGS. 5, 6 and 7.

Piston 24 disposed in piston chamber 22 is actuated by fluid pressure, e.g. compressed air. As best seen in FIGS. 1 to 3, the housing 21 is provided with a pair of ports 44, 45 to which suitable pressure lines (not shown) may be connected for directing a fluid pressure to opposite sides of piston 24 to effect the reciprocation thereon within piston chamber 22. A port 47 is provided for introducing a fluid pressure into piston chamber 23 to effect the upward displacement of piston 37 within the piston chamber 23, as best viewed in FIG. 7. In doing so, the piston springs 41 are compressed. Upon release of the fluid pressure acting on piston 37, the compressive force on springs 41 is released, whereby the springs 41 biases or forces the piston 37 to return to its normal inoperative position.

Figure 10:
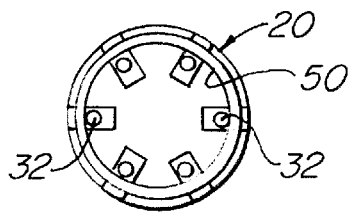
FIG. 10 is a top view of FIG. 9.
Figure 12:
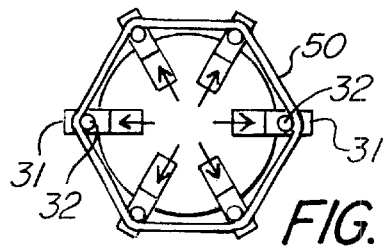
FIG. 12 is a top view of FIG. 11.
Figure 9:
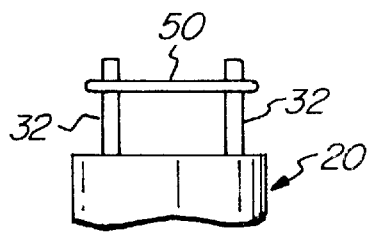
FIG. 9 is a schematic side view illustrating the gripping of an annular member.
Figure 11:
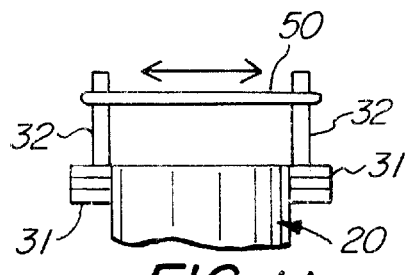
FIG. 11 is a schematic side view illustrating the slides in a radial protracted position wherein the annular member is expanded.
Figure 14:
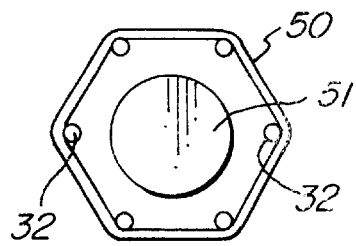
FIG. 14 is a top view of FIG. 13.

With the component parts of the gripper assembly thus described, the operation of the gripper assembly is as follows. Referring to FIGS. 9 to 17, the gripper assembly 20 is moved into position for gripping thereon an expandable "O" ring 50. This is attained by positioning the gripper fingers 32 of the gripper 20 so that they are received within the inner periphery of the "O" ring 50, as noted in FIGS. 9 and 10. With the gripper fingers 32 properly positioned, as seen in FIGS. 9 and 10, a fluid medium, e.g. compressed air, is introduced into piston chamber 22 through port 44 to exert a fluid pressure on piston 24 to effect the upward displacement thereof within piston chamber 22. In doing so, the radial slides 31 are displaced radially outwardly, as seen in FIGS. 11 and 12 to expand the "O" ring 50 mounted on fingers 32. As the "O" ring 50 is maintained in its expanded position, the gripper 20 is positioned relative to a work piece 51 which is to receive the "O" ring 50. It will be noted that the workpiece 51 may be provided with a groove 52 forming a seat for the "O" ring to be received thereon.

Figure 7:
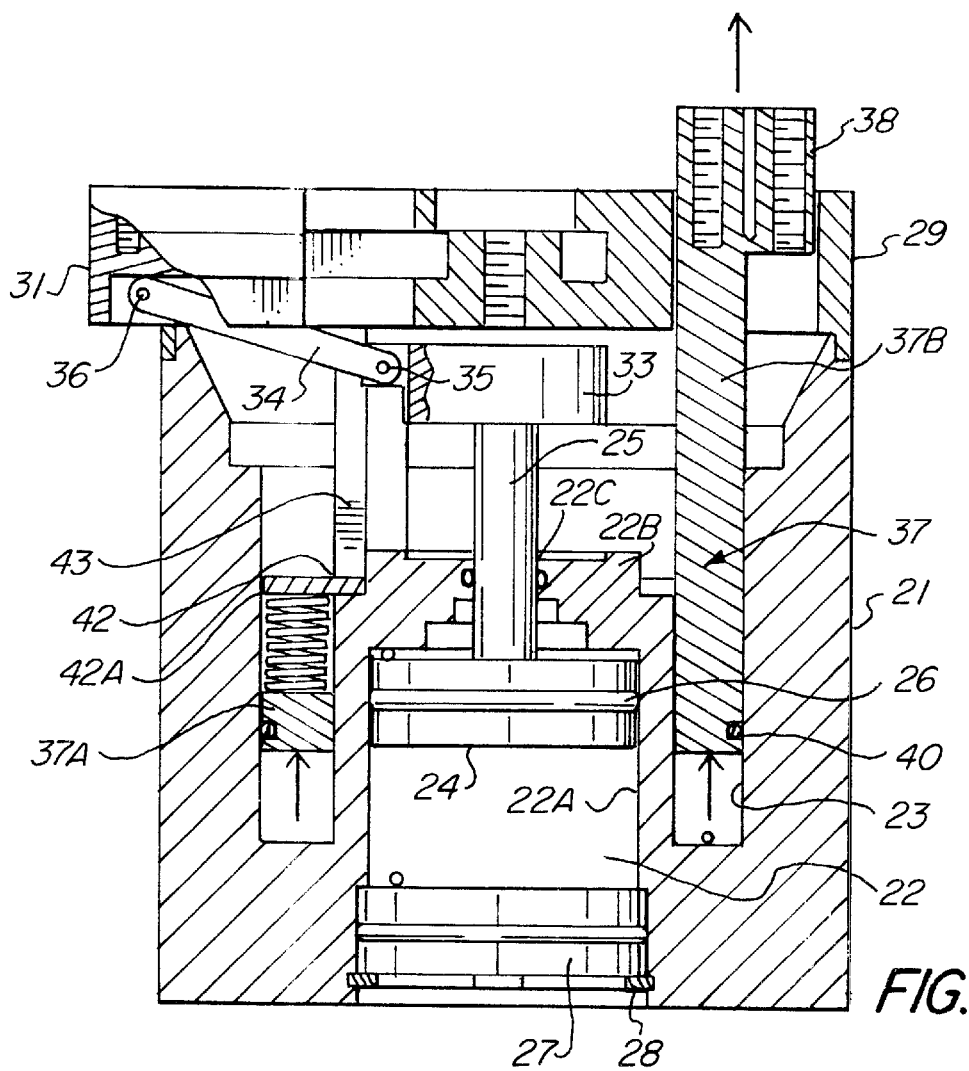
FIG. 7 is a sectional view similar to FIG. 6 showing the pushers in the protracted position.
Figure 8:
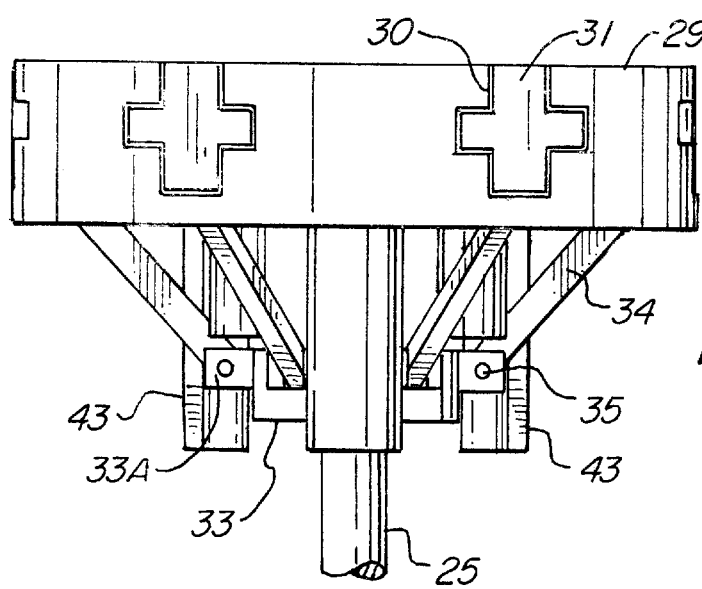
FIG. 8 is a detail side elevational view of the cover plate and associated link connection.
Figure 16:
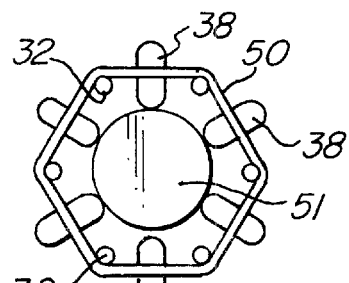
FIG. 16 is a top view of FIG. 15.
Figure 13:
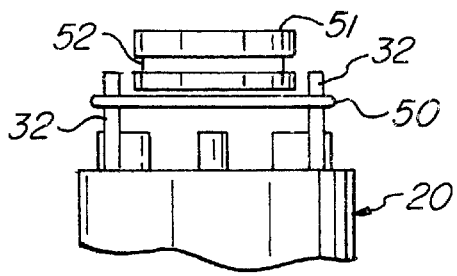
FIG. 13 is a view similar to FIG. 11 illustrating a workpiece in position to receive the annular member.
Figure 15:
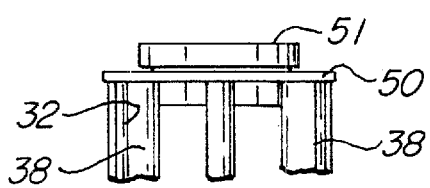
FIG. 15 is a schematic side view illustrating the pushers in a protracted position to lift the annular member off the gripping fingers.

With the parts positioned as seen in FIG. 13, a fluid pressure, e.g. compressed air, is introduced into chamber 23 via port 47, causing piston 37 to be upwardly displaced, as viewed in FIGS. 7 and 15, whereby the pushers 38 project upwardly through the through holes 39 in the cover plate 29 to push the "O" ring 50 off the gripper fingers 32 and onto the workpiece 51, as is occurring in FIGS. 15 and 16.

Figure 5:
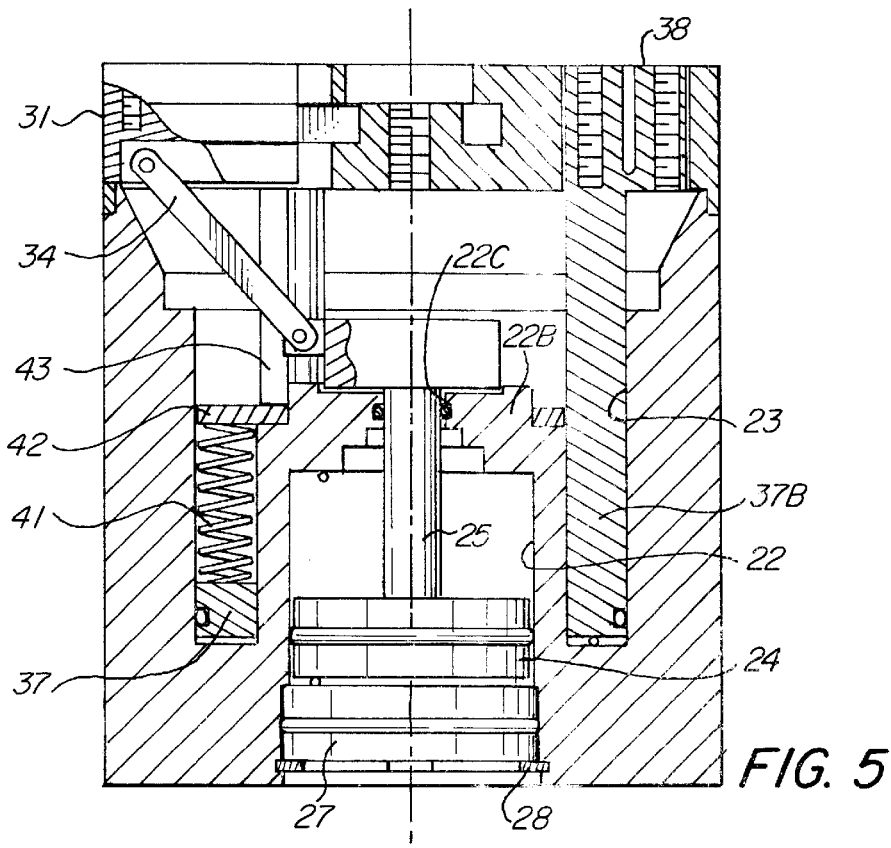
FIG. 5 is a section view taken along line 5—5 on FIG. 2.
Figure 6:
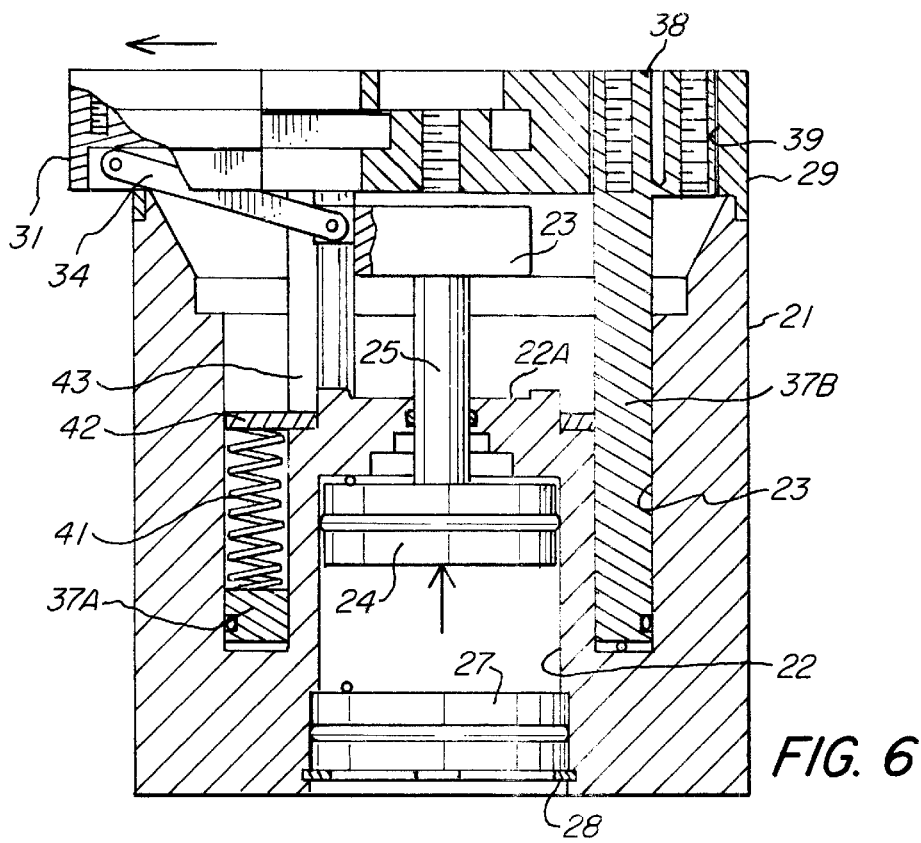
FIG. 6 is a section view similar to FIG. 5 showing the slides in a radial protracted position and the pusher piston in the retracted position.
Figure 17:
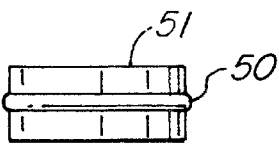
FIG. 17 is a side view of a workpiece with the annular member positioned thereon.

Upon release of the "O" ring 50 from the fingers 32, the inherent elasticity of the "O" ring causes the same to tightly embrace to the workpiece 51, at which time the compression imparted to springs 41 causes the same to return piston 37 toward its inoperative position to retract the pushers 38. Fluid pressure is also introduced through port 45 directing fluid to the opposite side of piston 24 to lower the same within its piston chamber 22, causing the slides 31 to return to their normal radially inward position as best seen in FIG. 5. FIG. 17 illustrates the workpiece 51 assembled with the "O" ring 50 thereon.

From the foregoing, it will be apparent that the gripper 20 is particularly suitable for positioning expandable annular members onto a workpiece in a relatively simple and facile manner.

While the present invention has been described with respect to a particular embodiment, modifications and variations may be made without departing from the spirit or scope of this invention.

What is claimed is:

1. A gripper for positioning and placing an annular member on a workpiece comprising:

a housing defining a first and a second piston chamber, a reciprocating piston disposed in each of said first and second chamber, a cover plate mounted on said housing, said cover plate having a plurality of reciprocating radial slides thereon and a plurality of through holes formed therein, each of said through holes being radially disposed between adjacent pairs of said radial slides, a piston rod connected to said piston disposed in said first chamber, linking means interconnecting said piston rod to each of said radial slides whereby said radial slides are radially displaced as the piston in said first piston chamber is actuated, a plurality of pushers connected to said piston disposed in said second piston chamber, said pushers being disposed in alignment with said through holes to extend therethrough, spring means for normally biasing said piston in said second piston chamber toward an inoperative position, and means for sequentially introducing a fluid pressure into each of said respective piston chambers to sequence the actuation of said pistons therein.

2. A gripper as defined in claim 1 and including a spreader finger connected to each of said slides for engaging an annular workpiece.

3. A gripper as defined in claim 2 and including means for selectively positioning each of said spreader fingers on its associated slide.

4. A gripper as defined in claim 1 wherein said piston disposed in said second piston chamber includes:

a plurality of circumferentially spaced apart longitudinal slots, and said spring means including a helical spring retained in each of said longitudinal slots for exerting a spring bias on said piston disposed in said second piston chamber.

5. A gripper as defined in claim 4 and including:

a compression ring mounted in said housing for maintaining said springs under compression.

6. A gripper as defined in claim 1 wherein said linking means comprises:

a link ring connected to said piston rod, and a plurality of interconnecting links, each of said interconnecting links being pivotally connected to said link ring and a corresponding slide.

7. A gripper particularly suitable for placing an annular member onto a workpiece comprising:

a housing defining a first piston chamber having an end wall, and a second piston chamber circumscribing said first piston chamber, a first piston reciprocally disposed within said first piston chamber, a piston rod connected to said first piston, said piston rod extending through said end wall, a cover plate mounted on said housing, a plurality of radial slideways circumferentially spaced in said cover plate, and said cover plate having a plurality of through holes formed therein, each through hole being disposed between adjacent pairs of said slideways, a slide reciprocally mounted in each of said slideways, a link ring connected to said piston rod, a plurality of interconnecting links, each of said interconnecting links having its opposed ends pivotally connected to said link ring and a corresponding slide, a second piston reciprocally mounted in said second piston chamber, said second piston having a plurality of longitudinally spaced piston arms, a pusher finger connected to each of said piston arms, said pusher finger being disposed in alignment with said through holes to extend through said through holes when said second piston is actuated, a plurality of springs exerting a spring bias on said second piston, said springs being disposed between adjacent pairs of said piston arms, a compression ring mounted in said housing for maintaining said springs in compression, and means for introducing a fluid pressure into each of said first and second piston chambers to effect sequential actuation of said first and second pistons.

8. A gripper as defined in claim 7 and including a spreader finger connected to each of said slides for engaging an annular member to be positioned onto a workpiece.

9. A gripper as defined in claim 8 wherein said spreader fingers are adjustably connected on its corresponding slide.

10. A gripper for positioning an annular member onto an associated workpiece comprising:

a housing having a pair of piston chambers wherein one piston chamber circumscribes the other piston chamber, a piston reciprocally disposed in each of said piston chambers, a cover plate mounted on said housing, a plurality of slides slidably mounted in said cover plate whereby said slides are radially displaceable relative to said cover plate, a piston rod connected to the piston in one of said piston chamber, link means connecting said piston rod to each of said slides, said cover plate having a plurality of through holes, and pushers connected to said piston disposed in the other of said piston chamber, said pushers being disposed in alignment with said through holes to extend therethrough when said piston in said one piston chamber is actuated.

11. A gripper as defined in claim 10 and including:

a means for introducing fluid pressure into each of said piston chambers for effecting the actuation of the respective pistons therein.

12. A gripper as defined in claim 11 wherein said fluid pressure introducing means introduces a fluid pressure on opposite sides of said piston disposed in said one piston chamber to effect the reciprocation thereof, and on one side only of said piston disposed in said other piston chamber.

13. A gripper comprising:

a housing defining a pair of piston chambers, a displaceable piston reciprocally disposed in each of said pair of chambers, a piston rod connected to one of said pistons, said piston rod extending beyond its respective piston chamber, a cover plate defining a closure for said housing, said cover plate having a plurality of spaced radially slideways formed therein, a radial slide slidably disposed in each of said radial slideways, a link means interconnecting each of said radial slides to said piston rod whereby said slides are radially displaced relative to its corresponding slideway as said piston is actuated, said cover plate having a plurality of through openings disposed between adjacent pairs of said radial slideways, the other piston being disposed in the other piston chamber, said other piston having a plurality of pushers elements thereon disposed in alignment with said through holes, spring means exerting a spring bias on said other piston, and means for sequentially introducing a fluid pressure into each of said chambers to effect sequential actuation of each of said pistons.

14. A gripper as defined in claim 13 whereby said means for sequencing the actuation of said pistons directs a fluid pressure alternately to both sides of said one piston to effect the reciprocation thereof within its piston chamber, and on only one side of said other piston to overcome the spring bias acting on said other piston.

15. A gripper as defined in claim 13 wherein said piston chambers are concentrically disposed within said housing.

16. A gripper comprising:

a housing having a pair of piston chambers formed therein, a cover plate connected to said housing, a plurality of slides slidably mounted on said cover plate for movement in a radial direction, a plurality of through holes formed in said cover plate, a piston disposed in each of said piston chambers, a piston rod connected to one of said pistons, a link interconnected between said piston rod and each of said slides, and the other of said pistons having a plurality of pushers connected thereto, said pushers being disposed in alignment with said through holes to extend therethrough in the operative position of said other piston.

17. A gripper as defined in claim 16 and including:

means for introducing a fluid pressure into each of said piston chambers to sequentially actuate said pistons.

18. A gripper as defined in claim 17 and including:

spring means for biasing said other piston toward the inoperative position thereof.

19. A gripper as defined in claim 16 wherein said cover plate includes:

a plurality of slideways radially disposed on said cover plate, one of said slides being slidably disposed in each of said slideways, and said link having its opposed ends pivotally connected to said piston rod and to one of said slides.

20. A gripper as defined in claim 16 and including:

a finger mounted on each of said slides.

21. A gripper as defined in claim 20 and including means on each of said slides for adjusting the position of said finger thereon.

22. A gripper assembly comprising:

a housing having a pair of piston chambers, a piston reciprocally disposed in each of said chambers, a cover plate mounted on said housing, a piston rod connected to one of said pistons, a plurality of radially spaced slides slidably disposed on said cover plate, a linking means interconnecting said piston rod to each of said slides, said cover plate having a plurality of through holes circumferentially spaced thereon, and the other of said pistons having a plurality of pushers disposed in alignment with said through holes to extend therethrough when said other piston is actuated.

23. A gripper assembly as defined in claim 22 and including spring means for exerting a spring bias on said other piston.

24. A gripper assembly as defined in claim 22 wherein said piston chambers are concentrically disposed within said housing.

* * * * *